Sheet 1. 2 Sheets
J. Reily.
Mower.
No. 2099
Reissued Oct. 31, 1865.
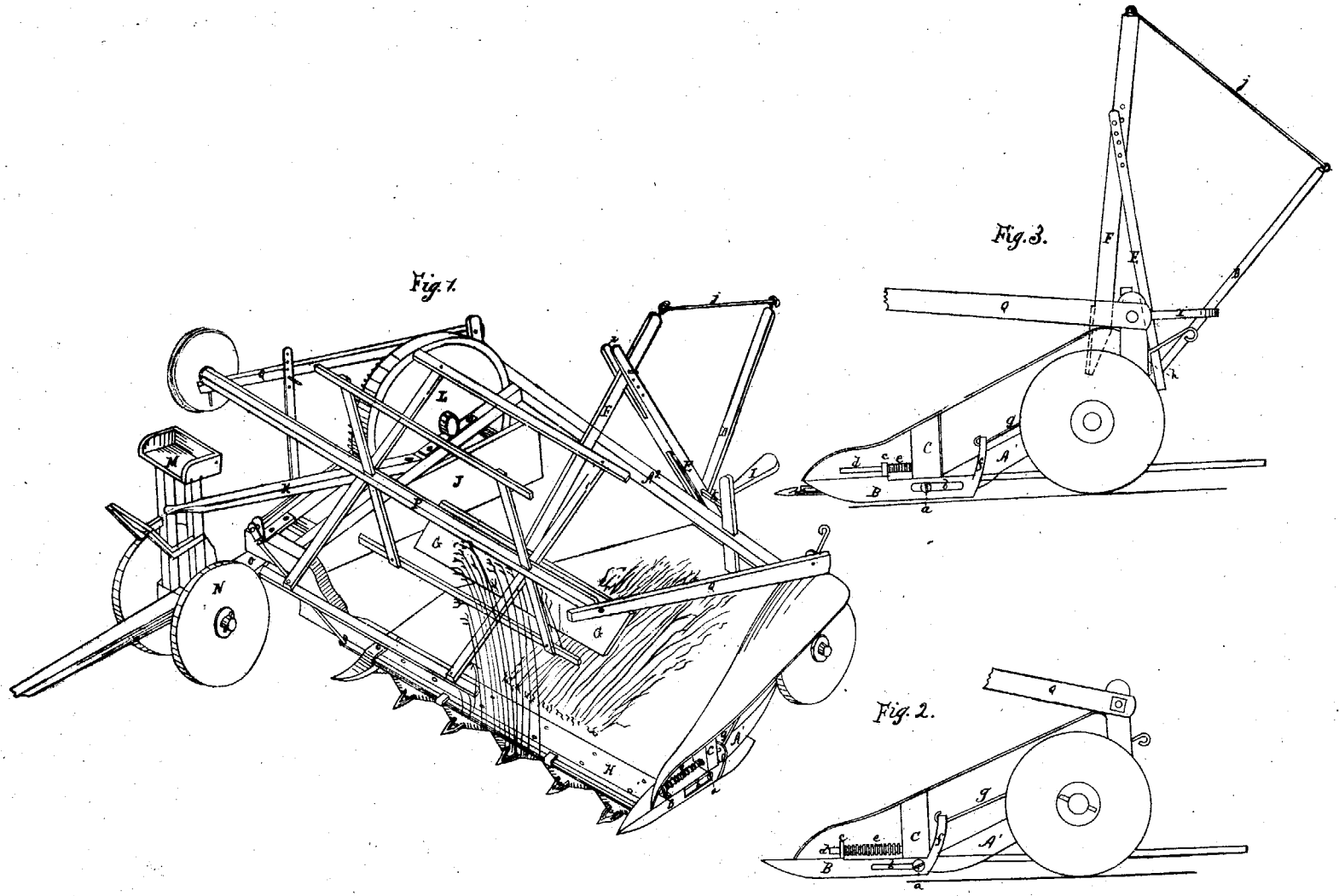

Sheet 2 2 Shee
J. Reilly.
Mower.
No. 2099 Reissued Oct. 31, 1865.
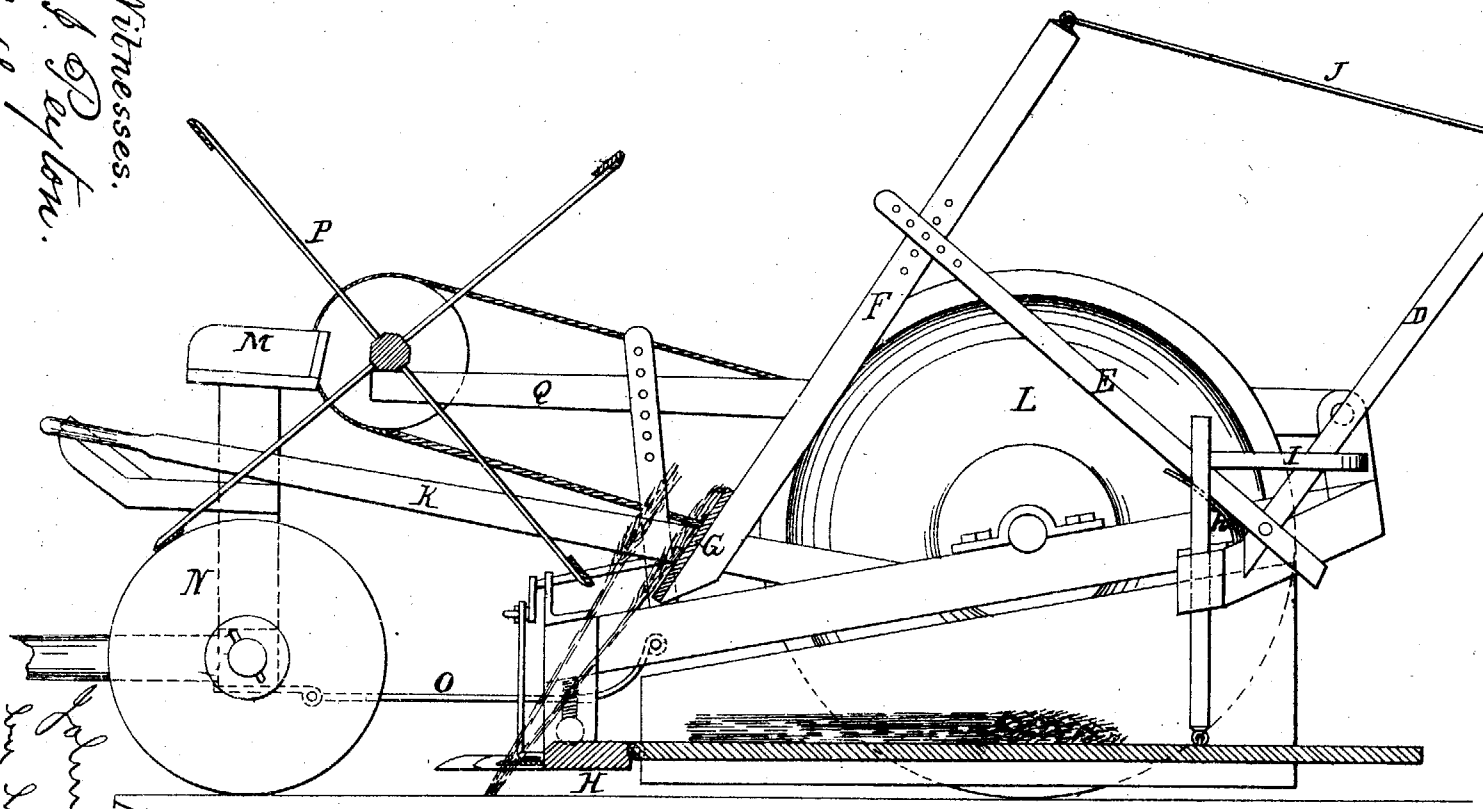
Witnesses.
J. S. Peyton.
Jh. Lang.
Inventor.
John Reilly
by his Attys
Baldwin & Son.

UNITED STATES PATENT OFFICE.

JOHN REILLY, OF WHITE PIGEON, MICHIGAN.

IMPROVEMENT IN HARVESTING-MACHINES.

Specification forming part of Letters Patent No. 13,828, dated November 20, 1855; Reissue No. 348, dated January 29, 1856; Reissue No. 2,099, dated October 31, 1865

*To all whom it may concern:*

Be it known that I, JOHN REILLY, formerly of Hart Prairie, in the county of Walworth and State of Wisconsin, but now of White Pigeon, in the county of St. Joseph and State of Michigan, have invented a new and useful Improvement in Harvesting-Machines, of which the following is a full, clear, and exact description, reference being had to the accompanying drawings, which make part of this specification, and in which—

Figure 1 represents a view in perspective of a harvesting-machine embracing my improvement, showing the grain-guard or cut-off in a position to receive the falling grain, and to keep it separate from that already lying on the platform. Fig. 2 represents a view in elevation of one side of a portion of the same, showing the divider as protruded; Fig. 3, a similar view of the same, showing the divider as retracted and the grain-guard or cut-off as withdrawn, so as to allow the cut grain to fall upon the platform preparatory to its being removed; and Fig. 4 is a central vertical longitudinal section view of my harvester.

It is one of the objects of my invention to separate the cut grain, as it falls upon the platform of a harvester, into gavels of suitable size for binding; and to this end the improvement herein claimed consists, first, in a novel method of separating the gavel lying upon the platform of a harvesting-machine from the falling grain by means of a grain-guard or cut-off moving parallel to the path of the machine, said cut-off being retracted to allow a gavel of proper size to accumulate upon the platform, and then being thrust or swung forward and remaining stationary, or nearly so, to receive the falling grain while the gavel already on the platform is being removed; second, in combining with the cutting apparatus and platform of a harvesting-machine a grain-guard or cut-off vibrating in lines parallel thereto, substantially as hereinafter described, to separate the falling from the fallen grain; third, in combining in a harvesting-machine a cutting apparatus, a platform, and a reel, with a grain-guard or cut-off moving in the same vertical plane as the reel, to separate the cut grain swept back by the reel into gavels of a size suitable for binding; fourth, in combining in a harvesting-machine a cutting apparatus projecting from one side of the main frame, and a platform the front edge of which is hinged to the finger-beam in such manner that its rear edge may be raised or lowered, with a grain-guard or cut-off vibrating behind the finger-beam and above the platform; fifth, in combining in a harvesting-machine a reel, a cutting apparatus, a hinged platform, and a cut-off.

In the accompanying drawings, the improvement herein claimed is shown as attached to a harvesting-machine of that class having hinged or swinging platforms to facilitate the removal of the grain, the front edge of the platform in this instance being hinged to the rear of the finger-beam H, (shown in Fig. 4,) while its rear edge is suspended from the rear rail, $A^2$, of the frame by means of the standard which sustains the raker's seat I.

The cutting apparatus may be raised and lowered, to override obstructions, by means of a lever, K, which is firmly bolted at one end to the inside rail of the frame that supports the driving-wheel L and the driving mechanism, and projects forward to the driver's seat M, mounted on a truck-carriage, N, which is connected to the main frame by a curved beam or reach, O.

The reel P is supported by bearers Q, extending from the rear of the frame. An adjustable divider, B, (to separate the grain to be cut from that to be left standing,) is secured to the front end of the beam $A'$ of the frame. An arm or standard, D, is secured rigidly to the rear cross-beam, $A^2$, of the frame, and has a backward inclination. A vertically-slotted arm, E, having a forward inclination, is pivoted at its lower end to the standard D by a joint which permits it to play freely vertically, but prevents any lateral movement. A spring, *h*, secured upon the frame constantly tends to force the arm E into a vertical position. An arm or balance lever, F, is pivoted at a point intermediate between its ends, so as to play free vertically in a saw-cut or slot in the arm E, both the lever and arm being provided with a series of holes through which a bolt may pass to adjust their relative positions to suit varying lengths of grain. A link-rod, *j*, connects the upper ends of the standard D and of the balance-lever F. The lower end of this lever F carries a guard-board or cut-off, G, which, when swung forward between the reel and platform, receives and supports the grain as it is cut, and thus prevents it from becoming entangled with the gavel already lying upon the platform or in process of removal therefrom. A handle, *k*, is fastened to the arm E, near the raker's stand, by which the raker may operate the cut-off in any convenient manner.

The operation is as follows: As the machine advances the grain is severed by the cutting apparatus, swept back by the reel, and falls upon the platform, the cut-off being swung back into the position shown in Fig. 3. When a gavel of sufficient size has accumulated upon the platform the cut-off is interposed between the reel and platform, as shown in Fig. 1, to receive and support the falling grain until the gavel has been removed. The cut-off is then withdrawn, the grain upon it falls on the platform, and the accumulation proceeds as before. As the cut-off moves in a path parallel to that of the machine, all dragging or tangling the straws sidewise is prevented, and the discharge of the grain in an even, compact mass is secured.

It is deemed unnecessary here to describe the details of construction of the other portions of the machine, as they form no part of the subject-matter herein claimed, and their construction is well known to all skillful constructers of harvesting-machines.

It is obvious that my invention might be modified in various ways, in order to adapt it to different classes of machines, without departing from the spirit of my invention. For example, the upper end of a link-rod may be attached to the arm E and the lower to a treadle worked by the raker's foot, or, if deemed necessary, the whole may be operated automatically.

What I claim as new under this patent is—

1. A grain-guard or cut-off which remains out of the way of the falling grain until a gavel of proper size has accumulated, is then interposed between the platform and reel to receive and support the falling grain, and remains there until the gavel already accumulated has been removed, when it is withdrawn until the next gavel has accumulated, the movements of the cut-off being parallel to the path of the machine, for the purpose set forth.

2. The combination, in a harvesting-machine, of a cutting apparatus and platform with a grain-guard or cut-off, the combination being and operating substantially as described.

3. The combination, substantially in the manner described, in a harvesting-machine, of a cutting apparatus, a platform, and a reel, with a grain-guard or cut-off arranged behind and moving in the same vertical plane as the reel, for the purpose of separating the grain swept back by the reel into gavels suitable for binding.

4. The combination, in a harvesting-machine, of a cutting apparatus projecting from one side of the main or gearing frame, and a hinged or swinging platform, with a grain-guard or cut-off vibrating over the platform.

5. The combination, in a harvesting-machine, of a reel, a cutting apparatus, a hinged or swinging platform, and a cut-off.

In testimony whereof I have hereunto subscribed my name.

JOHN REILLY.

Witnesses:
TH. LANG,
JOS. I. PEYTON.